United States Patent
Liu et al.

(10) Patent No.: US 9,923,479 B2
(45) Date of Patent: Mar. 20, 2018

(54) POWER SUPPLY UNIT AND CALIBRATION METHOD TO IMPROVE RELIABILITY

(71) Applicants: LITE-ON ELECTRONICS (GUANGZHOU) LIMITED, Guangzhou (CN); LITE-ON TECHNOLOGY CORP., Taipei (TW)

(72) Inventors: Yu-Shun Liu, Taipei (TW); Shi-en Wang, Taipei (TW); Shun-Hung Lo, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 0 days.

(21) Appl. No.: 15/496,208

(22) Filed: Apr. 25, 2017

(65) Prior Publication Data
US 2017/0353121 A1 Dec. 7, 2017

(30) Foreign Application Priority Data
Jun. 3, 2016 (CN) .......................... 2016 1 0389176

(51) Int. Cl.
*H02M 7/04* (2006.01)
*H02M 1/42* (2007.01)
*H02M 3/26* (2006.01)
*H02M 1/32* (2007.01)

(52) U.S. Cl.
CPC .............. *H02M 7/04* (2013.01); *H02M 1/32* (2013.01); *H02M 1/42* (2013.01); *H02M 3/26* (2013.01)

(58) Field of Classification Search
CPC ........................ H02M 2001/007; H02M 3/156
USPC ..................... 323/222, 266; 363/89
See application file for complete search history.

(56) References Cited

U.S. PATENT DOCUMENTS

| | | | |
|---|---|---|---|
| 8,810,214 B2 * | 8/2014 | Van Dijk | H02M 3/158 323/266 |
| 2002/0101750 A1 * | 8/2002 | Malik | H02M 1/4225 363/97 |
| 2005/0030772 A1 * | 2/2005 | Phadke | H02M 1/4225 363/71 |
| 2008/0278136 A1 * | 11/2008 | Murtojarvi | H03F 1/0211 323/299 |
| 2012/0206116 A1 * | 8/2012 | Fricker | H02M 3/158 323/271 |
| 2013/0038273 A1 * | 2/2013 | Riggio | H02J 7/00 320/107 |
| 2013/0093514 A1 * | 4/2013 | Xu | H02M 3/1582 330/129 |

(Continued)

*Primary Examiner* — Jeffrey Sterrett
(74) *Attorney, Agent, or Firm* — Rosenberg, Klein & Lee

(57) ABSTRACT

A power supply includes a boost converter, a capacitor, a step-down converter and a control unit. The boost converter, when activated, converts an input voltage into a boost voltage. The capacitor has a bulk voltage which is equal to the boost voltage when the boost converter is activated. The step-down converter converts the boost voltage into a step-down voltage for output. While the boost converter is deactivated, the control unit samples the input voltage and the bulk voltage, calculates an estimated value, and determines a calibration parameter. While the boost converter is activated, the control unit calculates a calibration value for enabling the boost converter to convert the input voltage with reference to the calibration value.

24 Claims, 4 Drawing Sheets

(56) References Cited

U.S. PATENT DOCUMENTS

2013/0127248 A1* 5/2013 Lai .................... H02J 9/005
    307/31
2017/0267111 A1* 9/2017 Ochi ............... B60L 11/1811

* cited by examiner

POWER SUPPLY UNIT AND CALIBRATION METHOD TO IMPROVE RELIABILITY

CROSS-REFERENCE TO RELATED APPLICATION

This application claims priority of Chinese Patent Application No. 201610389176.X, filed on Jun. 3, 2016.

FIELD

The disclosure relates to a power supply and a calibration method, and more particularly to a power supply with a bulk voltage being calibrated and a method to be implemented by the power supply for calibration of the bulk voltage.

BACKGROUND

Generally speaking, due to errors in manufacturing processes, differences exist in parameters of the same type of components among power supply units (PSUs). For a capacitor of a PSU, error in capacitance of the capacitor affects its voltage drop. The variation in the voltage drop influences the performance of the PSU, and lowers reliability of the PSU. In addition, a larger margin for error should be considered in designing the PSU for overcoming the issue of insufficient accuracy of voltage across the capacitor. The capacitor of the PSU is often referred to as a "bulk capacitor". The voltage across the capacitor of the PSU is often referred to as "bulk voltage". It is noted that reliability described here refers for example to the following: efficiency of the PSU, and precision of indicative characteristics of the PSU, such as hold-up time, regulation, stress, thermal, etc.

During the process of manufacturing conventional PSUs, in order to solve the problem of inaccuracy of the bulk voltage with respect to that according to PSU product specifications, the actual bulk voltage is measured by using a voltmeter in a production line for compensation of errors so as to calibrate the actual bulk voltage.

However, since the bulk voltage usually cannot be measured directly at an output port of the conventional PSU, a housing of the conventional PSU must be opened for the measurement of the bulk voltage. Opening of the housing might endanger operators on the production line due to possible electric shock from high voltage of the PSU, and could cause damages to the PSU. Moreover, it increases the manufacturing time. Besides, though the conventional PSUs have been calibrated during production, the reliability and performance thereof might still deviate from the PSU specifications due to variation in the bulk voltage caused by other abnormal factors.

SUMMARY

Therefore, an object of the disclosure is to provide a power supply and a calibration method that can alleviate at least one of the drawbacks of the prior art, and that can promote reliability (such as the hold-up time being guaranteed at a desired value) and performance of a PSU.

According to one aspect of the disclosure, the power supply includes a boost converter, a capacitor, a step-down converter, and a control unit. The boost converter is configured to receive an input voltage, and to, when activated, convert the input voltage into a boost voltage. The capacitor has a first terminal electrically connected to the boost converter, and a grounded second terminal. The capacitor has a bulk voltage between the first terminal and the second terminal thereof which is equal to the boost voltage when the boost converter is activated. The step-down converter is electrically connected to the boost converter and the first terminal of the capacitor. The step-down converter is configured to convert the bulk voltage into a step-down voltage for output when the boost converter is activated. The control unit is electrically connected to the boost converter. Under a condition that the boost converter is deactivated, the control unit is programmed to sample the input voltage and the bulk voltage, to calculate, at least according to the input voltage thus sampled, an estimated value which is associated with an estimation of the bulk voltage when it is determined that the input voltage and the bulk voltage are both stable, and to determine a calibration parameter according to the estimated value and the bulk voltage thus sampled. Under a condition that the boost converter is activated, the control unit is further programmed to sample the bulk voltage, to calculate a calibration value according to the calibration parameter and the bulk voltage thus sampled, and to transmit the calibration value to the boost converter for enabling the boost converter to convert the input voltage with reference to the calibration value.

According to another aspect of the disclosure, the calibration method is configured for a power supply. The power supply includes a boost converter, a capacitor, a step-down converter and a control unit. The boost converter receives an input voltage, and, when activated, converts the input voltage into a boost voltage. The capacitor is electrically connected to the boost converter and has a bulk voltage which is equal to the boost voltage when the boost converter is activated. The step-down converter is electrically connected to the boost converter and the capacitor, and is configured to convert the bulk voltage into a step-down voltage for output when the boost converter is activated. The control unit is electrically connected to the boost converter. The calibration method is to be implemented by the control unit and includes the following steps: A) under a condition that the boost converter is deactivated, sampling the input voltage and the bulk voltage; B) calculating, at least according to the input voltage thus sampled, an estimated value which is associated with an estimation of the bulk voltage when it is determined that the input voltage and the bulk voltage are both stable, and determining a calibration parameter according to the estimated value and the bulk voltage thus sampled; and C) under the condition that the boost converter is activated, sampling the bulk voltage, calculating a calibration value according to the calibration parameter and the bulk voltage thus sampled, and transmitting the calibration value to the boost converter for enabling the boost converter to convert the input voltage with reference to the calibration value.

An effect of the disclosure resides in that, by virtue of the control unit of the power supply which implements the calibration method, the boost voltage outputted by the boost converter may remain stable, so the step-down voltage outputted by the step-down converter may also remain stable. Thus, the reliability of the power supply is improved.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
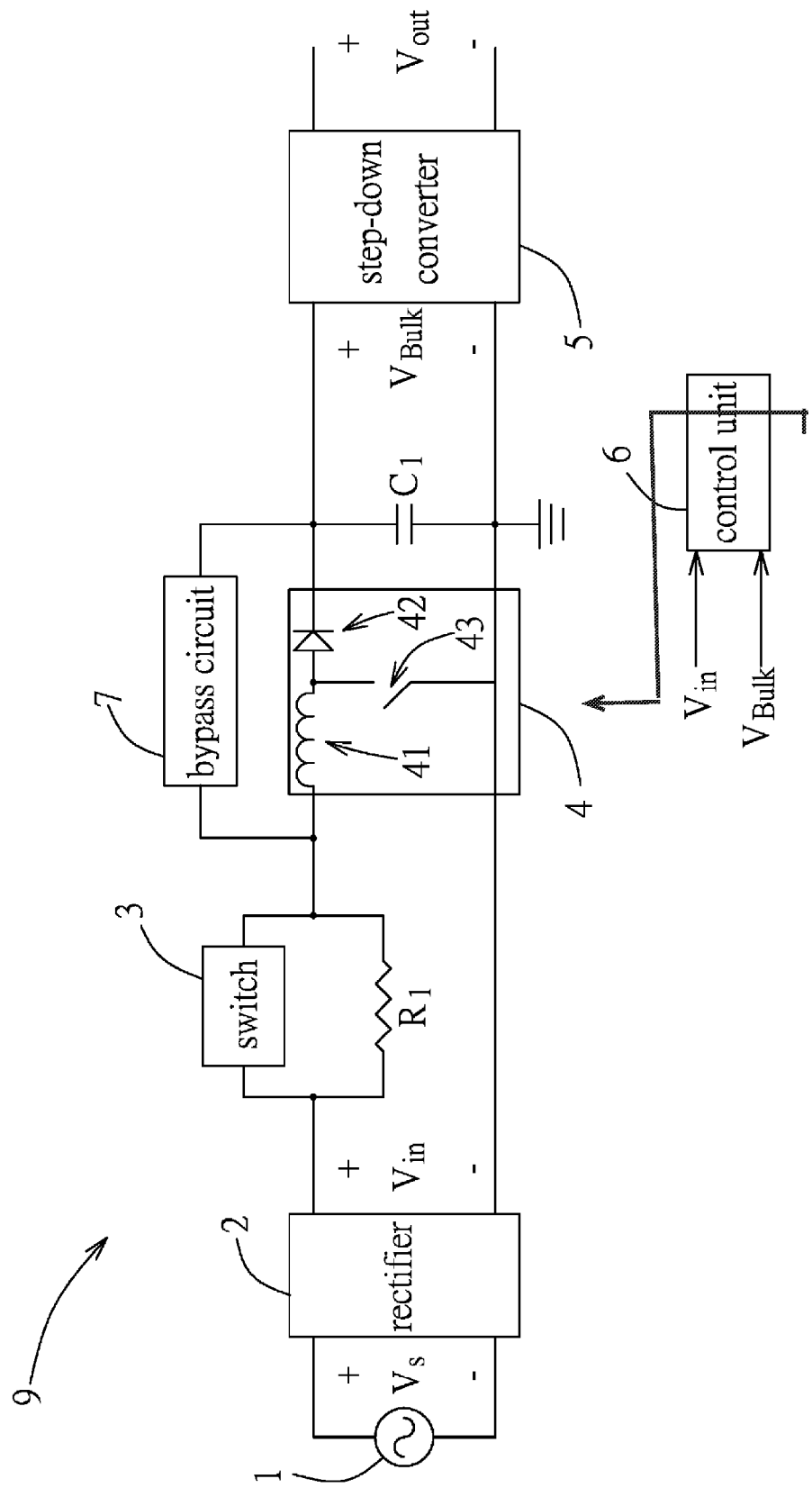
FIG. 1 is a block circuit diagram illustrating an embodiment of a power supply according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a power supply 9 according to this disclosure is described below. The power supply 9 is configured to be electrically connected to an alternating-current (AC) power source 1 for receiving an AC source voltage ($V_S$), and includes a rectifier 2, a switch 3, a resistor ($R_1$), a bypass circuit 7, a boost converter 4, a capacitor ($C_1$), a step-down converter 5 and a control unit 6.

Figure 2:
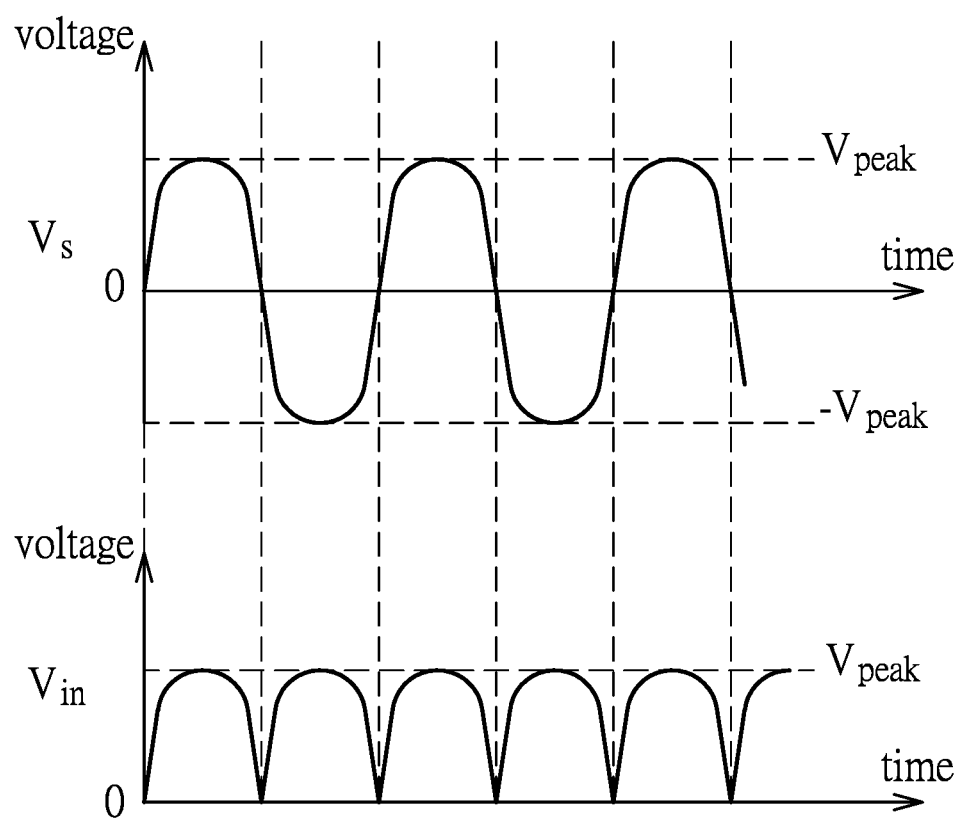
FIG. 2 is a timing diagram illustrating an embodiment of a source voltage being rectified to result in an input voltage.

Referring further to FIG. 2, in this embodiment, the rectifier 2 is a bridge full-wave rectifier. The rectifier 2 is configured to receive the source voltage ($V_S$), and to convert the source voltage ($V_S$) into an input voltage ($V_{in}$) which is a direct current (DC) voltage. In this conversion, the negative component of the source voltage ($V_S$) is converted into a positive polarity with the same amplitude to result in the input voltage ($V_{in}$). In other embodiments, the rectifier 2 may be another kind of rectifier. Alternatively, the rectifier 2 may be omitted if the input voltage ($V_{in}$) is directly provided by a DC source.

As depicted in FIG. 1, the resistor ($R_1$) and the switch 3 are connected in parallel. The parallel connection of the resistor ($R_1$) and the switch 3 is connected in series between the boost converter 4 and the rectifier 2. The resistor ($R_1$) serves as a current limiting resistor to prevent inrush current caused when the power supply 9 is switched on. In this embodiment, the switch 3 is a relay, but is not limited thereto.

When activated, the boost converter 4 is configured to receive the input voltage ($V_{in}$) and to convert the input voltage ($V_{in}$) into a boost voltage. For the ease of explanation of this embodiment, a voltage drop across the switch 3 or the resistor ($R_1$) is not elaborated herein. It should be noted that the boost converter 4 is not limited to merely stepping up the input voltage ($V_{in}$) for outputting the boost voltage, and in other cases, the boost converter 4 may directly output the input voltage ($V_{in}$) to serve as the boost voltage without stepping up or stepping down the input voltage ($V_{in}$). Besides, the boost converter 4 also provides a function of power factor correction (PFC). In detail, the boost converter 4 includes an inductor 41, a diode 42, and a converter switch 43. The inductor 41 has a first terminal configured to receive the input voltage ($V_{in}$), and a second terminal. The diode 42 has a first terminal electrically connected to the second terminal of the inductor 41, and a second terminal electrically connected to the capacitor ($C_1$). The converter switch 43 has a first terminal electrically connected to the second terminal of the inductor 41, and a grounded second terminal.

The capacitor ($C_1$) has a first terminal electrically connected to the second terminal of the diode 42 of the boost converter 4, and a grounded second terminal. The capacitor ($C_1$) has a bulk voltage ($V_{Bulk}$) between the first terminal and the second terminal thereof and equal to the boost voltage when the boost converter 4 is activated. In the technical field of power supplies, the capacitor ($C_1$) is usually referred to as a bulk capacitor. The capacitance of the bulk capacitor usually ranges from 300 μF (microfarad) to 600 μF, but is not limited thereto.

The bypass circuit 7 has a first terminal electrically connected to the rectifier 2 via at least one of the switch 3 or the resistor ($R_1$) for receiving the input voltage ($V_{in}$) (similarly, the voltage drop of the switch 3 or the resistor ($R_1$) is omitted), and a second terminal electrically connected to the first terminal of the capacitor ($C_1$). The bypass circuit 7 is connected to the boost converter 4 in parallel. In another embodiment, the first terminal of the bypass circuit 7 may be connected to the rectifier 2 directly for the configuration where the switch 3 and the resistor (R1) are both omitted. The bypass circuit 7, in this embodiment, is a bypass diode which has an anode serving as the first terminal of the bypass circuit 7 and a cathode serving as the second terminal of the bypass circuit 7.

The step-down converter 5 is electrically connected to the boost converter 4 and the first terminal of the capacitor ($C_1$). The step-down converter 5 is configured to receive the bulk voltage ($V_{Bulk}$) (i.e., the boost voltage when the boost converter 4 is activated), and to convert the bulk voltage ($V_{Bulk}$) (i.e., boost voltage) into a step-down voltage ($V_{out}$) for output when the boost converter 4 is activated.

The control unit 6 is electrically connected to the rectifier 2 and the boost converter 4 for the purpose of sampling the input voltage ($V_{in}$) and the bulk voltage ($V_{Bulk}$), respectively, when the boost converter 4 is deactivated, and sampling the boost voltage (i.e., the bulk voltage ($V_{Bulk}$)) when the boost converter 4 is activated. It should be noted that, in this embodiment, the control unit 6 is an independent component of the power supply 9. In another embodiment, the control unit 6 may be integrated into other components of the power supply 9, such as being integrated into the step-down converter 5, but implementation of the same is not limited to the disclosure herein.

Under a condition that the boost converter 4 is deactivated, the control unit 6 is programmed to sample the input voltage ($V_{in}$) and the bulk voltage ($V_{Bulk}$), and to calculate an estimated value ($V_1$) (see FIG. 4) according to the input voltage ($V_{in}$) thus sampled when it is determined that the input voltage ($V_{in}$) and the bulk voltage ($V_{Bulk}$) are both stable. The estimated value ($V_1$) is associated with an estimation of the bulk voltage ($V_{Bulk}$). The control unit 6 is further programmed to determine a calibration parameter (Slope) according to the estimated value ($V_1$) and the bulk voltage thus sampled.

Under a condition that the boost converter 4 is activated, the control unit 6 is programmed to sample the boost voltage, which is equal to the bulk voltage ($V_{Bulk}$) of the capacitor ($C_1$), to calculate a calibration value ($V_{Bulk(Result)}$) according to the calibration parameter (Slope) and the bulk voltage thus sampled, and to transmit the calibration value ($V_{Bulk(Result)}$) to the boost converter 4 for enabling the boost converter 4 to convert the input voltage ($V_{in}$) with reference to the calibration value ($V_{Bulk(Result)}$). In this way, the boost converter 4 may be controlled to output a compensated boost voltage, so the step-down voltage ($V_{out}$) outputted by the step-down converter 5 may be maintained at a desired value. Moreover, the hold-up time of the step-down converter 5 can be guaranteed at a desired value.

In detail, under the condition that the boost converter 4 is deactivated, the capacitor ($C_1$) is charged via a charging path by the source voltage ($V_S$). The control unit 6 is programmed to calculate the estimated value ($V_1$) according to the equation, $$V_1 = V_{peak} - V_{path},$$

where $V_{peak}$ is a peak value of the input voltage ($V_{in}$), and $V_{path}$ is a voltage drop of the charging path, which includes the rectifier 2, the bypass circuit 7, and at least one of the resistor ($R_1$) or the switch 3. In other words, the voltage drop of the charging path includes a voltage drop of the bypass circuit 7, a voltage drop of the resistor ($R_1$) and/or the switch 3, and a voltage drop of traces and/or other elements on the charging path. It should be noted that, in this case, when the boost converter 4 is deactivated, the capacitor ($C_1$) is charged only by the rectifier 2 via the charging path. Therefore, the estimated value ($V_1$) may serve as the estimation of the bulk voltage ($V_{Bulk}$). More, $V_{path}$ may be calculated or evaluated in advance and stored in the control unit 6.

According to different circuit design purposes, in a variation of this embodiment, the switch 3 and the resistor ($R_1$) may be omitted in the power supply 9. In this way, the boost converter 4 is electrically and directly connected to the rectifier 2 for receiving the input voltage ($V_{in}$), and the capacitor ($C_1$) is charged by the source voltage ($V_S$) via a charging path which includes the rectifier 2 and the bypass circuit 7 and which has a voltage drop of $V_{path}$. Alternatively, in another embodiment, the bypass circuit 7 may be omitted in the power supply 9. For example, by virtue of the inductor 41 and the diode 42 of the boost converter 4, $V_{path}$ is the voltage drop of the charging path for charging the capacitor ($C_1$), and the charging path includes one of the switch 3 and the resistor ($R_1$), the inductor 41 and the diode 42. In another variation of this embodiment, the switch 3, the resistor ($R_1$) and the bypass circuit 7 may all be omitted in the power supply 9. In such case, for example, $V_{path}$ is the voltage drop of the charging path for charging the capacitor ($C_1$) which includes the inductor 41 and the diode 42.

The control unit 6 is further programmed to obtain directly sampling the input voltage ($V_{in}$). Alternatively, when the source voltage ($V_S$) is in the form of a sinusoidal wave (i.e. sine wave), such as mains electricity AC supply or the wave shown in FIG. 2, the peak value ($V_{peak}$) of the input voltage ($V_{in}$) may also be obtained by first determining the root-mean-square (RMS) voltage ($V_{rms}$) of the input voltage ($V_{in}$), and then multiplying the root-mean-square voltage ($V_{rms}$) of the input voltage ($V_{in}$) by the square root of 2.

Aside from sampling the input voltage ($V_{in}$), the control unit 6 may alternatively directly sample the source voltage ($V_S$) to obtain the peak value ($V_{peak}$) (see FIG. 2).

The control unit 6 is further programmed to determine the calibration parameter (Slope) by the equation, $$\text{Slope} = \frac{V_1}{V_2},$$

where $V_2$ is the bulk voltage thus sampled by the control unit 6 when the boost converter 4 is deactivated.

The control unit 6 is further programmed to calculate the calibration value ($V_{Bulk(Result)}$) according to the equation, $$V_{Bulk(Result)} = \text{Slope} \times V_{Bulk(Sample)},$$

where $V_{Bulk(Sample)}$ is the boost voltage thus sampled when the boost converter 4 is activated. At this moment, the boost voltage should be equivalent to the bulk voltage ($V_{Bulk}$).

It should be noted that, in this embodiment, the calibration parameter (Slope) is calculated according to the estimated value ($V_1$) and the bulk voltage thus sampled ($V_2$) at a single time point. In another embodiment, the calibration parameter (Slope) may be calculated according to the estimated value and the bulk voltage thus sampled at two different time points. For example, the control unit 6 is programmed to determine the calibration parameter (Slope) by the equation, $$\text{Slope} = \frac{V_{12} - V_{11}}{V_{22} - V_{21}},$$

where $V_{11}$ is the estimated value which is associated with an estimation of the bulk voltage at a first time point, $V_{21}$ is the bulk voltage thus sampled at the first time point, $V_{12}$ is the estimated value which is associated with an estimation of the bulk voltage at a second time point, and $V_{22}$ is the bulk voltage thus sampled at the second time point. The estimated values ($V_{11}$ and $V_{12}$) may be calculated according to the equation for calculating the estimated value ($V_1$).

Next, the control unit 6 is further programmed to calculate an offset parameter (Offset) according to the equation, $$\text{Offset} = V_{11} - V_{21} \times \text{Slope},$$

Finally, the control unit 6 is programmed to calculate the calibration value ($V_{Bulk(Result)}$) according to the equation, $$V_{Bulk(Result)} = \text{Slope} \times V_{Bulk(Sample)} + \text{Offset},$$

where $V_{Bulk(Sample)}$ is the boost voltage (the bulk voltage) thus sampled when the boost converter 4 is activated. The control unit 6 is programmed to transmit the calibration value ($V_{Bulk(Result)}$) to the boost converter 4 for enabling the boost converter 4 to convert the input voltage ($V_{in}$) with reference to the calibration value ($V_{Bulk(Result)}$). In this way, the boost converter 4 may be controlled to output a compensated boost voltage, so the step-down voltage ($V_{out}$) outputted by the step-down converter 5 may be maintained at a desired value. Moreover, the hold-up time of the step-down converter 5 can be guaranteed at a desired value.

According to another aspect of this disclosure, an embodiment of a calibration method is described below. The calibration method is to be implemented by the control unit 6 of the power supply 9.

Figure 3:
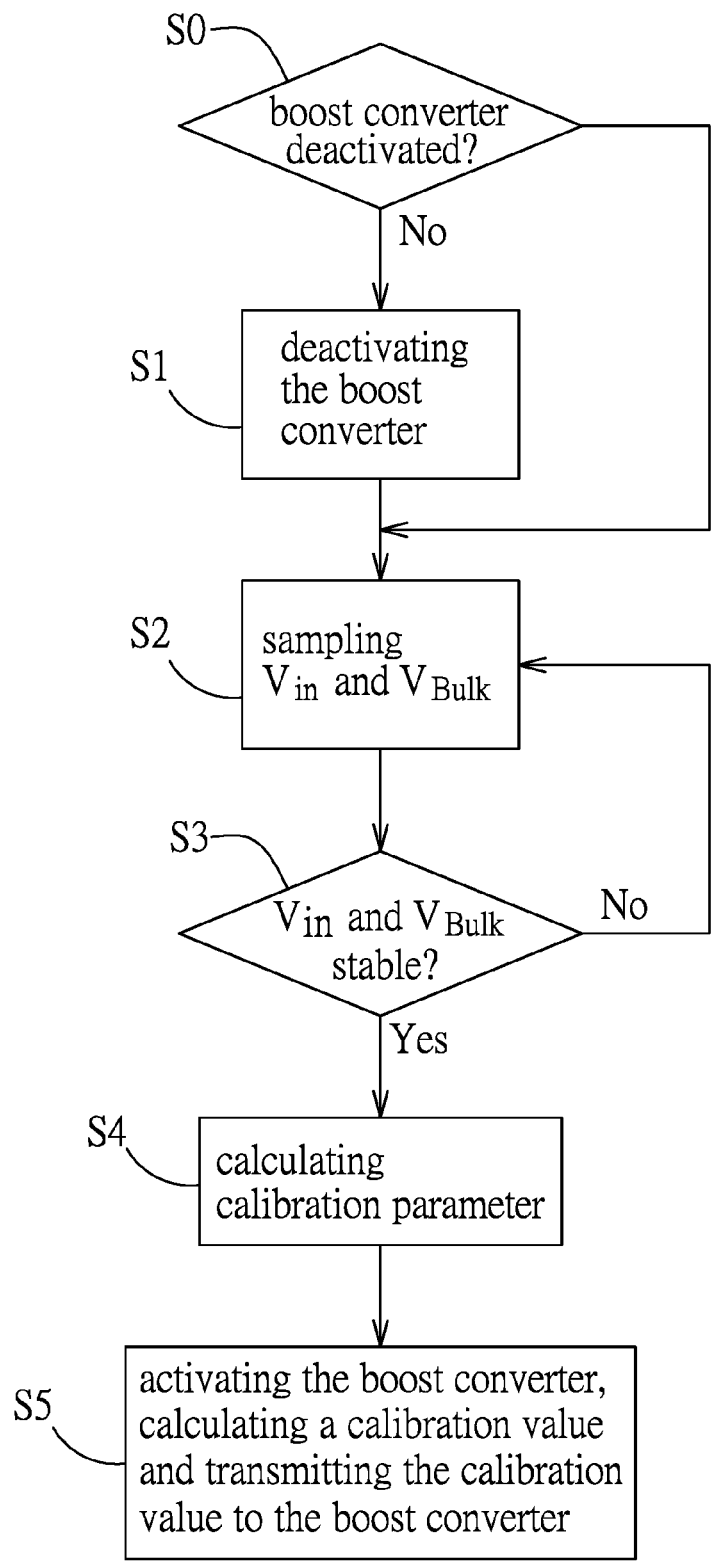
FIG. 3 is a flow chart illustrating an embodiment of a calibration method according to this disclosure.

Referring to FIG. 3, a flow chart shows an embodiment of the steps (S0 to S5) of the calibration method.

In step S0, the control unit 6 determines whether the boost converter 4 is deactivated. In the affirmative, the flow proceeds to step S2. In the negative, that is, the boost converter 4 is activated, the flow goes to step S1.

In step S1, the control unit 6 issues a signal to the boost converter 4 for deactivation of the same.

In step S2, when the boost converter is deactivated, the control unit 6 samples the input voltage ($V_{in}$) and the bulk voltage ($V_{Bulk}$).

In step S3, the control unit 6 determines whether the input voltage ($V_{in}$) and the bulk voltage ($V_{Bulk}$) are both stable. In the affirmative, the flow proceeds to step S4. In the negative, the flow goes back to step S2.

Generally, it is determined that a voltage is stable when a value of variation in the voltage, during a certain period of time, is maintained at zero or is smaller than a preset range. Specifically, the control unit 6 determines whether a value of variation in the root-mean-square (RMS) value of the input voltage ($V_{in}$) or the peak value ($V_{peak}$) of the input voltage ($V_{in}$), during a certain period of time, is maintained at zero or is smaller than a preset range. When the value of variation in the root-mean-square (RMS) value or the peak value ($V_{peak}$) remains at zero or is within the preset range, the control unit 6 is able to determine accordingly that the input voltage ($V_{in}$) is stable. Similarly, stability of the bulk voltage ($V_{Bulk}$) may also be determined by continuously sampling the same for a time period and observing a value of variation in the root-mean-square value of the bulk voltage ($V_{Bulk}$) or the peak value thereof.

In step S4, the control unit 6 calculates, at least according to the input voltage ($V_{in}$) thus sampled, an estimated value ($V_1$) which is associated with an estimation of the bulk voltage ($V_{Bulk}$), and to determine a calibration parameter (Slope) according to the estimated value ($V_1$) and the bulk voltage thus sampled. Then the flow proceeds to step S5.

In step S5, under the condition that the boost converter 4 is activated, for example, but not limited to, the boost converter 4 being activated by the control unit 6, the control unit 6 calculates a calibration value ($V_{Bulk(Result)}$) according to the calibration parameter (Slope) and the bulk voltage thus sampled ($V_{Bulk(Sample)}$), and transmits the calibration value ($V_{Bulk(Result)}$) to the boost converter 4 for enabling the boost converter 4 to convert the input voltage ($V_{in}$) with reference to the calibration value ($V_{Bulk(Result)}$). In this way, an effect of compensation of errors of the boost voltage outputted by the boost converter 4 may be achieved.

For example, in an ideal case, when all components of the power supply 9 work normally and no error exists in these components, the boost voltage outputted by the boost converter 4 (should be equal to the bulk voltage ($V_{Bulk}$)) is 400V. When there are errors in the circuit, such as errors due to non-ideal property of the boost converter 4, the boost voltage may, for example, become 390V. By applying the calibration method according to the disclosure, the control unit 6 first calculates the calibration parameter (Slope), then samples the boost voltage (i.e., the bulk voltage ($V_{Bulk}$)) after the boost converter 4 is activated, next calculates the calibration value ($V_{Bulk(Result)}$), and lastly transmits the calibration value ($V_{Bulk(Result)}$) to the boost converter 4 for controlling the boost converter 4 to output a boost voltage of 410V. In this way, an effect that an actual value of the boost voltage is 400V may be achieved, so the step-down voltage ($V_{out}$) outputted by the step-down converter 5 may be maintained at a desired value. Moreover, the hold-up time of the step-down converter 5 can be guaranteed at a desired value so as to promote reliability of the power supply 9.

Moreover, the calibration method for the power supply 9 may be performed in the following scenarios. The first scenario is in a production line of the power supply 9 since the boost converter 4 is originally deactivated during the manufacturing process. The second scenario takes place after the power supply 9 leaves the factory, where a user is able to deactivate the boost converter 4 in a time-triggered manner or event-triggered manner by means of an Input/Output (I/O) interface provided in the power supply 9 through preset communication protocols, such as I2C.

Figure 4:
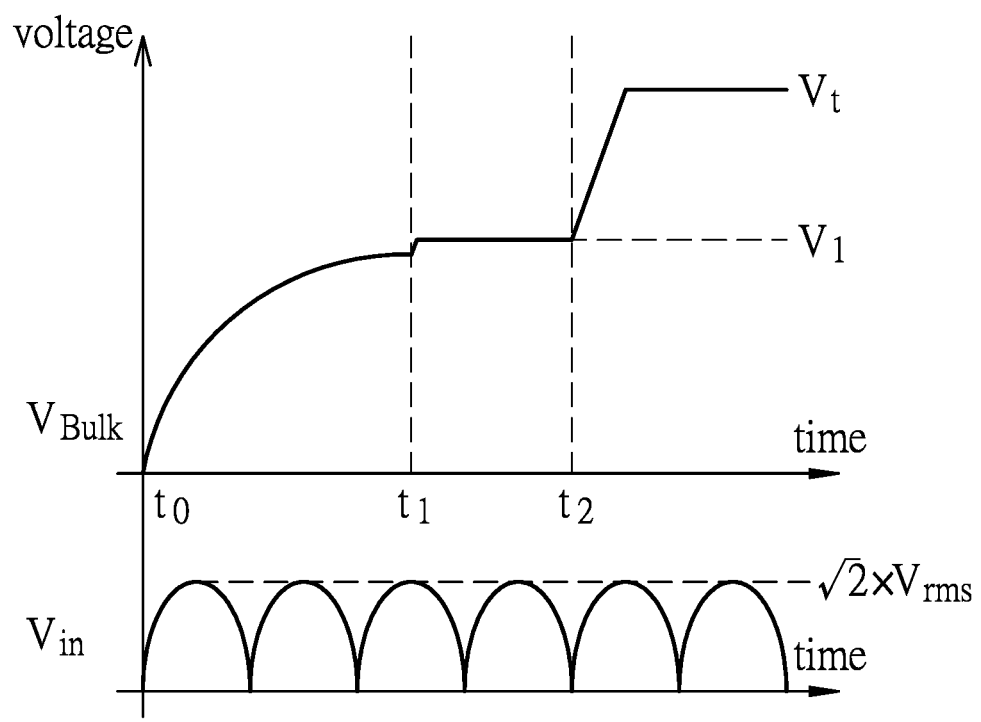
FIG. 4 is a timing diagram illustrating an embodiment of a bulk voltage in a power supply when the calibration method according to this disclosure is implemented.

Referring to FIG. 4 in combination with FIG. 1, where FIG. 4 provides a timing diagram to illustrate an embodiment that the calibration method according to this disclosure is implemented. The horizontal axis of the timing diagram represents time, and the vertical axis thereof represents voltage. The timing diagram illustrates the relationship between the bulk voltage ($V_{Bulk}$) and the input voltage ($V_{in}$) after the power supply 9 is turned on. When the power supply 9 is just turned on, the voltage across the capacitor ($C_1$) is zero ($V_{Bulk}=0$). To prevent inrush current from causing damage to the boost converter 4, the boost converter 4 is not activated until the capacitor ($C_1$) is charged via the bypass circuit 7 to reach a predetermined value (such as the estimated value ($V_1$)). In detail, at the time interval between $t_0$ and $t_1$, the capacitor ($C_1$) is charged by the input voltage ($V_{in}$) via the charging path which includes the resistor ($R_1$) and the bypass circuit 7. At the time point of $t_1$, the switch 3 is turned on, and resistance of the charging path is reduced so that the voltage of the capacitor ($C_1$) (i.e., the bulk voltage ($V_{Bulk}$)) is raised to the voltage ($V_1$). At a time point of $t_2$, the boost converter 4 is activated, and after that, the bulk voltage ($V_{Bulk}$) is raised to a target voltage ($V_t$) from the voltage ($V_1$). In this way, at the time interval between $t_1$ and $t_2$ when the power supply 9 is turned on while the boost converter 4 is deactivated, the calibration method according to the disclosure may be performed for calibration of the boost voltage (the bulk voltage ($V_{Bulk}$)).

In sum, since it is required that the boost converter be deactivated at first for carrying out the calibration method of this disclosure, the calibration method of this disclosure may be directly applied in the production line of the power supply 9, so as to save human resource for testing, equipment cost and manufacturing cost, and to promote automation of the production line of power supply products. Besides, in a condition that the step-down voltage ($V_{out}$) is sufficient for supporting normal operation of a load system, i.e., in a condition that the step-down voltage ($V_{out}$) to be outputted may be maintained at a desired voltage level without activating the boost converter 4, the calibration method for a power supply according to the disclosure may be performed to compensate the errors of the bulk voltage ($V_{Bulk}$) caused by any abnormal factors in the circuit. In this way, the reliability of a power supply may be improved.

In the description above, for the purposes of explanation, numerous specific details have been set forth in order to provide a thorough understanding of the embodiment (s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connect ion with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A power supply comprising:
   a boost converter configured to receive an input voltage, and to, when activated, convert the input voltage into a boost voltage;
   a capacitor having a first terminal that is electrically connected to said boost converter, and a second terminal that is grounded, and further having a bulk voltage between said first terminal and said second terminal of said capacitor which is equal to the boost voltage when said boost converter is activated;
   a step-down converter electrically connected to said boost converter and said first terminal of said capacitor, and configured to convert the bulk voltage into a step-down voltage for output when said boost converter is activated; and a control unit electrically connected to said boost converter;

under a condition that said boost converter is deactivated, said control unit being programmed to sample the input voltage and the bulk voltage, to calculate, at least according to the input voltage thus sampled, an estimated value which is associated with an estimation of the bulk voltage when it is determined that the input voltage and the bulk voltage are both stable, and to determine a calibration parameter according to the estimated value and the bulk voltage thus sampled;

under a condition that said boost converter is activated, said control unit being further programmed to sample the bulk voltage, to calculate a calibration value according to the calibration parameter and the bulk voltage thus sampled, and to transmit the calibration value to said boost converter for enabling said boost converter to convert the input voltage with reference to the calibration value.

2. The power supply as claimed in claim 1, wherein said boost converter includes:

an inductor having a first terminal that is configured to receive the input voltage, and a second terminal;

a diode having a first terminal that is electrically connected to said second terminal of said inductor, and a second terminal that is electrically connected to said first terminal of said capacitor; and a converter switch having a first terminal that is electrically connected to said second terminal of said inductor, and a second terminal that is grounded.

3. The power supply as claimed in claim 2, wherein under the condition that said boost converter is deactivated, said capacitor is charged via a charging path by the input voltage;

wherein said control unit is programmed to calculate the estimated value according to the equation, $$V_1 = V_{peak} - V_{path},$$

where $V_1$ is the estimated value, $V_{peak}$ is a peak value of the input voltage, and $V_{path}$ is a voltage drop of the charging path, which includes said inductor and said diode.

4. The power supply as claimed in claim 3, further comprising a resistor and a switch which is connected in parallel with said resistor, the parallel connection of said resistor and said switch being connected in series to said boost converter, $V_{path}$ being the voltage drop of the charging path, which further includes at least one of said resistor or said switch in addition to said inductor and said diode.

5. The power supply as claimed in claim 1, further comprising a bypass circuit that has a first terminal configured to receive the input voltage, and a second terminal electrically connected to said first terminal of said capacitor, and that is connected in parallel with said boost converter.

6. The power supply as claimed in claim 5, wherein under the condition that said boost converter is deactivated, said capacitor is charged via a charging path by the input voltage;

wherein said control unit is programmed to calculate the estimated value according to the equation, $$V_1 = V_{peak} - V_{path},$$

where $V_1$ is the estimated value, $V_{peak}$ is a peak value of the input voltage, and $V_{path}$ is a voltage drop of the charging path, which includes said bypass circuit.

7. The power supply as claimed in claim 6, further comprising a resistor and a switch that is connected in parallel with said resistor, the parallel connection of said resistor and said switch being connected in series to said boost converter, $V_{path}$ being the voltage drop of the charging path, which further includes at least one of said resistor or said switch in addition to said bypass circuit.

8. The power supply as claimed in claim 1 being configured to receive a source voltage, the power supply further comprising a rectifier, said rectifier being configured to be electrically connected to said boost converter, to receive the source voltage, and to convert the source voltage to the input voltage which is a direct current voltage.

9. The power supply as claimed in claim 8, wherein said boost converter includes:

an inductor having a first terminal that is configured to receive the input voltage, and a second terminal;

a diode having a first terminal that is electrically connected to said second terminal of said inductor, and a second terminal that is electrically connected to said first terminal of said capacitor; and a converter switch having a first terminal that is electrically connected to said second terminal of said inductor, and a second terminal that is grounded.

10. The power supply as claimed in claim 9, wherein under the condition that said boost converter is deactivated, said capacitor is charged via a charging path by the input voltage;

wherein said control unit is programmed to calculate the estimated value according to the equation, $$V_1 = V_{peak} - V_{path},$$

where $V_1$ is the estimated value, $V_{peak}$ is a peak value of the input voltage, and $V_{path}$ is a voltage drop of the charging path, which includes said rectifier, said inductor, and said diode.

11. The power supply as claimed in claim 10, further comprising a resistor and a switch that is connected in parallel with said resistor, the parallel connection of said resistor and said switch being connected in series between said rectifier and said boost converter, $V_{path}$ being the voltage drop of the charging path, which further includes at least one of said resistor or said switch in addition to said rectifier, said inductor, and said diode.

12. The power supply as claimed in claim 8, further comprising a bypass circuit that has a first terminal electrically connected to said rectifier, that has the first terminal configured to receive the input voltage, and a second terminal electrically connected to said first terminal of said capacitor, and that is connected in parallel with said boost converter.

13. The power supply as claimed in claim 12, wherein under the condition that said boost converter is deactivated, said capacitor is charged via a charging path by the input voltage;

wherein said control unit is programmed to calculate the estimated value according to the equation, $$V_1 = V_{peak} - V_{path},$$

where $V_1$ is the estimated value, $V_{peak}$ is a peak value of the input voltage, and $V_{path}$ is a voltage drop of the charging path, which includes said rectifier and said bypass circuit.

14. The power supply as claimed in claim 13, further comprising a resistor and a switch that is connected in parallel with said resistor, the parallel connection of said resistor and said switch being connected in series between said rectifier and said boost converter, $V_{path}$ being the voltage drop of the charging path, which further includes at least one of said resistor or said switch in addition to said rectifier and said bypass circuit.

15. A calibration method for a power supply, the power supply including a boost converter, a capacitor, a step-down converter, and a control unit, the boost converter receiving an input voltage, and, when activated, converting the input voltage into a boost voltage, the capacitor being electrically connected to the boost converter and having a bulk voltage which is equal to the boost voltage when the boost converter is activated, the step-down converter being electrically connected to the boost converter and the capacitor, and being configured to convert the boost voltage into a step-down voltage for output when the boost converter is activated, the control unit being electrically connected to the boost converter, the calibration method to be implemented by the control unit comprising steps of:

A) under a condition that the boost converter is deactivated, sampling the input voltage and the bulk voltage;

B) calculating, at least according to the input voltage thus sampled, an estimated value which is associated with an estimation of the bulk voltage when it is determined that the input voltage and the bulk voltage are both stable, and determining a calibration parameter according to the estimated value and the bulk voltage thus sampled; and C) under the condition that the boost converter is activated, sampling the bulk voltage, calculating a calibration value according to the calibration parameter and the bulk voltage thus sampled, and transmitting the calibration value to the boost converter for enabling the boost converter to convert the input voltage with reference to the calibration value.

16. The calibration method as claimed in claim 15, the calibration method further comprising, prior to step A), step of:

when it is determined that the boost converter is activated, transmitting a control signal generated by the control unit to the boost converter for deactivation of the boost converter.

17. The calibration method as claimed in claim 16, the boost converter including at least a diode, under the condition that the boost converter is deactivated, the capacitor being charged via a charging path by the input voltage, wherein step B) includes calculating the estimated value according to the equation, $$V_1 = V_{peak} - V_{path},$$

where $V_1$ is the estimated value, $V_{peak}$ is a peak value of the input voltage, and $V_{path}$ is a voltage drop of the charging path, which includes the diode.

18. The calibration method as claimed in claim 17, wherein step B) further includes obtaining the peak value of the input voltage by one of two ways:

sampling the input voltage; and determining the root-mean-square value of the input voltage and multiplying the root-mean-square value of the input voltage by the square root of 2.

19. The calibration method as claimed in claim 18, wherein step B) further includes determining the calibration parameter by the equation, $$\text{Slope} = \frac{V_1}{V_2},$$

where Slope is the calibration parameter, and $V_2$ is the bulk voltage thus sampled.

20. The calibration method as claimed in claim 19, wherein the step C) of calculating a calibration value includes calculating the calibration value according to the equation, $$V_{Bulk(Result)} = \text{Slope} \times V_{Bulk(Sample)},$$

where $V_{Bulk(Result)}$ is the calibration value, and $V_{Bulk(Sample)}$ is the bulk voltage thus sampled when the boost converter is activated.

21. The calibration method as claimed in claim 20, the power supply further including a resistor and a switch that is connected in parallel with the resistor, the parallel connection of the resistor and the switch being connected in series to the boost converter, wherein in step B), $V_{path}$ is the voltage drop of the charging path, which further includes at least one of the resistor or the switch in addition to the diode.

22. The calibration method as claimed in claim 18, wherein step B) further includes calculating the calibration parameter according to the equation, $$\text{Slope} = \frac{V_{12} - V_{11}}{V_{22} - V_{21}},$$

where Slope is the calibration parameter, $V_{11}$ is the estimated value which is associated with an estimation of the bulk voltage at a first time point, $V_{21}$ is the bulk voltage thus sampled at the first time point, $V_{12}$ is the estimated value which is associated with an estimation of the bulk voltage at a second time point, and $V_{22}$ is the bulk voltage thus sampled at the second time point;

wherein step B) further includes calculating an offset parameter according to the equation, $$\text{Offset} = V_{11} - V_{21} \times \text{Slope},$$

where Offset is the offset parameter.

23. The calibration method as claimed in claim 22, wherein the step of calculating a calibration value includes calculating the calibration value according to the equation, $$V_{Bulk(Result)} = \text{Slope} \times V_{Bulk(Sample)} + \text{Offset},$$

where $V_{Bulk(Result)}$ is the calibration value, and $V_{Bulk(Sample)}$ is the bulk voltage that is sampled when the boost converter is activated.

24. The calibration method as claimed in claim 23, the power supply further including a resistor and a switch that is connected in parallel with the resistor, the parallel connection of the resistor and the switch being connected in series to the boost converter, wherein in step B), $V_{path}$ is the voltage drop of the charging path, which further includes at least one of the resistor or the switch in addition to the diode.

* * * * *